No. 690,315. Patented Dec. 31, 1901.
S. PALING.
SMOKE CONDENSING APPARATUS.
(Application filed Dec. 24, 1900.)
(No Model.) 2 Sheets—Sheet 1.
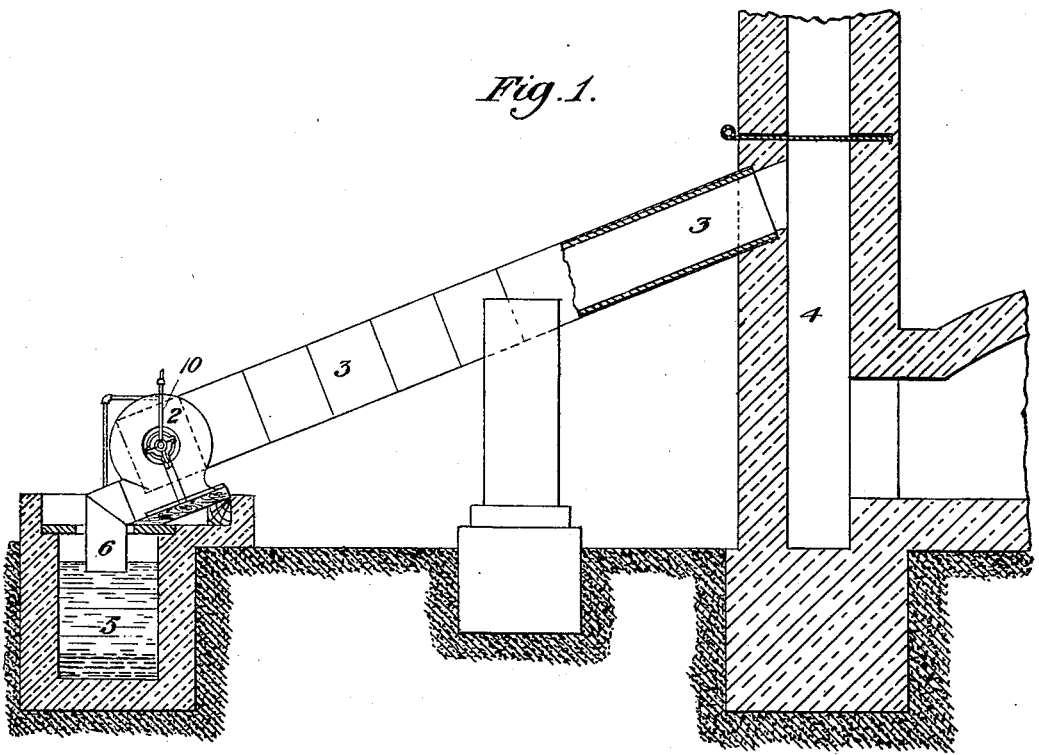
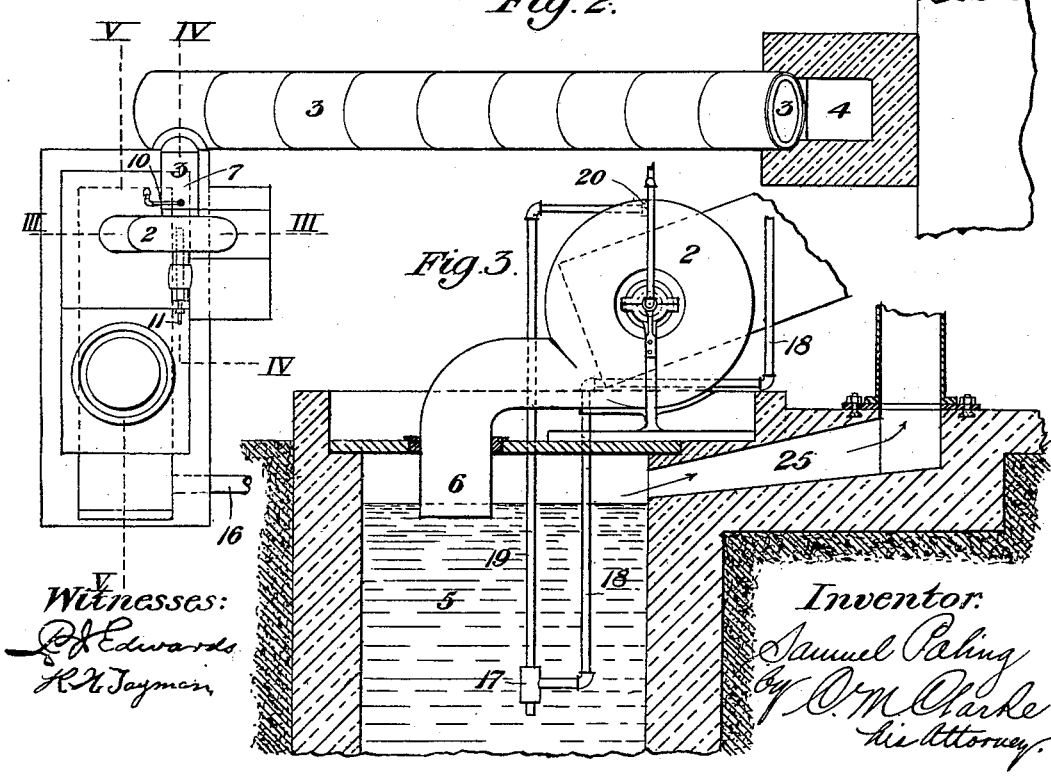
Witnesses:
Inventor:
Samuel Paling
by O. M. Clarke
his Attorney.

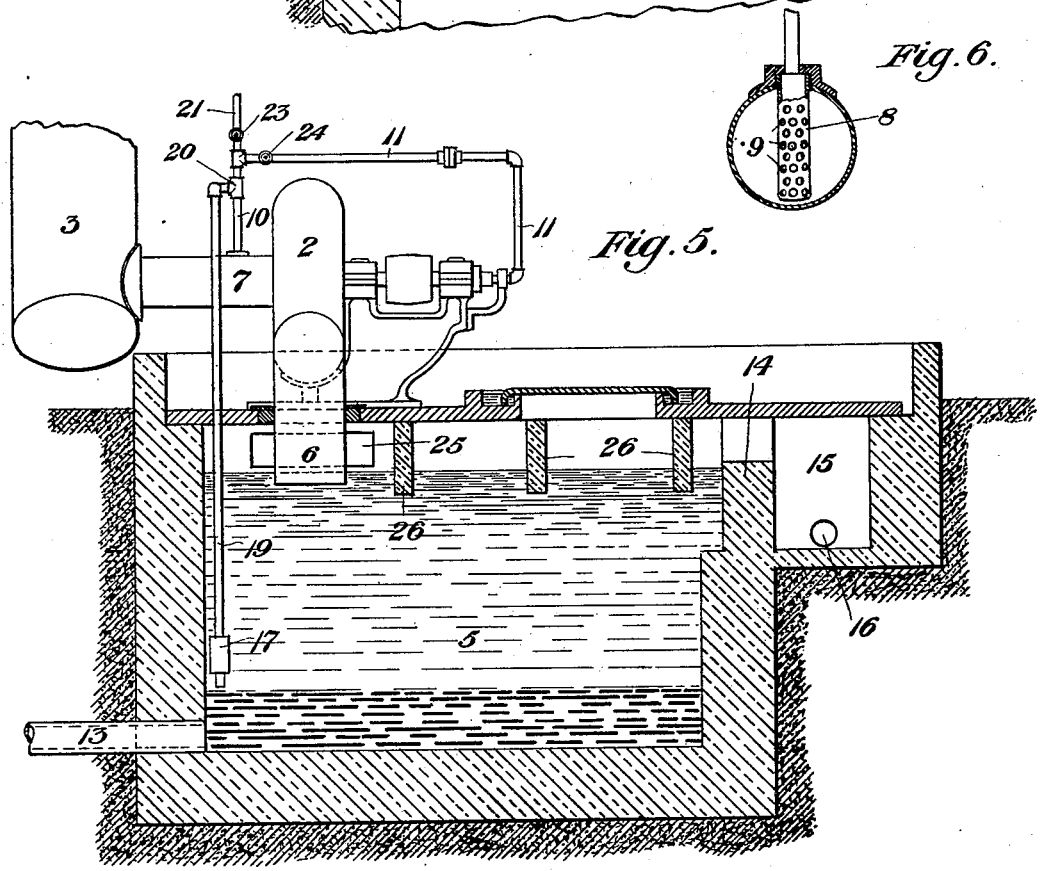

UNITED STATES PATENT OFFICE.

SAMUEL PALING, OF PITTSBURG, PENNSYLVANIA.

SMOKE-CONDENSING APPARATUS.

SPECIFICATION forming part of Letters Patent No. 690,315, dated December 31, 1901.

Application filed December 24, 1900. Serial No. 40,869. (No model.)

*To all whom it may concern:*

Be it known that I, SAMUEL PALING, a citizen of Great Britain, and a resident of Pittsburg, county of Allegheny, State of Pennsylvania, have invented certain new and useful Improvements in Smoke-Condensing Apparatus, of which the following is a specification, reference being had to the accompanying drawings, forming part of this specification, in which—

Figure 1 is a sectional elevation showing my improved smoke-condensing apparatus applied to the stack of a furnace. Fig. 2 is a plan view of Fig. 1. Fig. 3 shows the blower in side elevation and the catch-pit in vertical section on the line III III of Fig. 2, the parts being shown on an enlarged scale. Fig. 4 is a further-enlarged sectional view indicated by the line IV IV of Fig. 2. Fig. 5 is a similar view indicated by the line V V of Fig. 2. Fig. 6 is a cross-sectional view indicated by the line VI VI of Fig. 4.

My invention has for its objects the elimination of smoke and other products of combustion; and it consists of apparatus designed and adapted to attain such object by the process of condensation.

Further supplementary objects are to reclaim the by-products of combustion in an economical and practicable manner. These objects are secured by intimately mixing and commingling the products of combustion in their passage from the combustion-chamber with water, either in the form of a spray or by immersion, or both.

In the practice of my invention I employ a suitable exhaust mechanism, such as a fan 2, of well-known design, to which by any suitably-arranged conduits, as 3, the smoke is conducted from the stack 4 of a furnace or other source of supply. The action of the fan produces a current or artificial draft, which may be regulated so as to utilize it in the operation of the furnace, as will be readily understood without detailed illustration or description. The fan is located in convenient proximity above a catch-pit or water-basin 5, into which the products of combustion are discharged by the fan through a delivery-pipe 6, the end of which extends slightly below the water-level, as shown.

Inserted in the incoming pipe 7, connecting the conduit 3 with the fan, is a header 8, having on the side toward the incoming current of smoke and other products of combustion a series of small perforations 9, which header is connected with a water-pipe 10, leading from any source of water-supply under pressure.

A branch pipe 11 is introduced through the hollow shaft 12 of the blower, terminating at the inner end of the shaft, through which pipe water is introduced and sprayed against the incoming current of smoke, &c., and the action of such spray and that from the header 8 is to partially condense the incoming products of combustion. These partially-condensed products are then forced downwardly by the fan 2 into the water of the catch-pit, where they are further condensed, and the oxids, sulfates, and various volatile matter from metals, coal, &c., are deposited in the form of sediment in the bottom of the catch-pit or are carried in solution, to be further reduced or chemically treated. A suitable device, as a tar-pump, may be employed to remove these precipitated by-products through an outlet-opening, as pipe 13.

The catch-pit is provided at one end with a weir or dam 14, over which the excess water will flow into pool 15, from which it is removed by suitable drain 16. When, however, it is desired to raise the intensity of the ammoniacal liquor, the liquid is pumped back through the condensing and washing apparatus, and for such purpose I have provided a pumping device, such as a steam-ejector 17, to which steam is supplied by pipe 18 and by which the water is forced back into circulation by pipe 19, connected at 20 with the main water-supply pipe 21, by which water is supplied to the header 8 and from which through branch pipe 11 water is carried through the hollow shaft 12, the pipe 11 being provided at its end 22 preferably with a spray-tip. Valves 23 24 are interposed in pipes 21 and 11, by which the flow of water may be regulated or shut off, and it will be understood that the catch-pit water may be wholly or partially used through the ejector, according to circumstances. The uncondensed gas or gases and other uncondensed matter escape outwardly from the catch-pit through a pipe or conduit 25 to any suitable point of discharge, and such gas or gases will by reason of the condensing operation be rendered entirely free of poisonous or objectionable matter and may be freely discharged into the atmosphere without deleterious results.

For the purpose of quieting the liquid in the catch-pit and overcoming the disturbing action produced by the fan any suitable device, as slats or obstacles 26, may be laid across the surface, as shown in Fig. 5.

The advantages of my invention will be appreciated by those skilled in the art and by the public generally, as by its use the smoke of bituminous and other fuel is practically annihilated, the carbon and other products of combustion being taken out, while the resulting by-products are saved and made a source of income.

Changes and variations may be made in the construction or arrangement of the apparatus without departing from my invention as claimed, since I do not wish to be confined to the exact construction shown, but to include all such variations as would be within the province of the skilled mechanic.

What I claim is—

1. The combination of a blower provided with a hollow shaft, a smoke-conduit leading to the blower, a spray-pipe passing through the hollow shaft for spraying the gases coming through said smoke-conduit, and a catch-pit into which the blower discharges; substantially as described.

2. The combination of a blower provided with a hollow shaft, a smoke-conduit leading to the blower, a sprayer in such conduit, a spray-pipe passing through the hollow shaft, and a catch-pit into which the blower discharges, substantially as described.

3. The combination of a smoke-conduit, a blower, a connection from the smoke-conduit to the blower, a catch-pit for containing the washing liquid, a connection from the catch-pit to the blower, lateral slats located across the top of the catch-pit and extending below the surface of the liquid for quieting ebullitions caused by the blower, a weir-partition extending across the catch-pit at one end and above the liquid-level, a secondary chamber beyond the weir-partition, and a drain-pipe leading from secondary chamber, substantially as described.

Signed at Pittsburg this 23d day of October, 1900.

SAMUEL PALING.

Witnesses:
JAS. J. MCAFEE,
C. M. CLARKE.